US006914408B2

(12) United States Patent
Sawada et al.

(10) Patent No.: US 6,914,408 B2
(45) Date of Patent: Jul. 5, 2005

(54) MOTOR CONTROL APPARATUS AND ELECTRIC VEHICLE USING SAME

(75) Inventors: Takefumi Sawada, Tokyo (JP); Satoru Kaneko, Tokyo (JP); Ryoso Masaki, Tokyo (JP); Mitsuyuki Hombu, Tokyo (JP); Hiroshi Katayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/925,700

(22) Filed: Aug. 10, 2001

(65) Prior Publication Data

US 2002/0117990 A1 Aug. 29, 2002

(30) Foreign Application Priority Data

Feb. 27, 2001 (JP) ........................................ 2001-052477

(51) Int. Cl.[7] .............................. H02P 5/28; H02P 7/36
(52) U.S. Cl. ...................... 318/727; 318/799; 318/806; 318/721
(58) Field of Search .................................. 318/727, 715, 318/721, 772, 773, 779, 782, 798, 799, 801, 805, 806, 811, 434, 432

(56) References Cited

U.S. PATENT DOCUMENTS

| 5,691,611 A | * 11/1997 | Kojima et al. ............... 318/254 |
| 5,994,870 A | * 11/1999 | Kaneko et al. ............... 318/798 |
| 6,005,365 A | * 12/1999 | Kaneko et al. ............... 318/700 |
| 6,191,550 B1 | * 2/2001 | Yoshihara ..................... 318/661 |
| 6,281,656 B1 | * 8/2001 | Masaki et al. ............... 318/700 |
| 6,677,724 B1 | * 1/2004 | Kim et al. .................... 318/700 |

FOREIGN PATENT DOCUMENTS

| EP | 1128543 A2 | * 8/2001 | ............. H02P/6/13 |
| JP | 09056199 A | * 2/1997 | ............ H02P/21/00 |
| JP | 9-294390 | 11/1997 | ............ H02P/6/18 |
| JP | 11-55994 | 1/1999 | ............ H02P/7/63 |
| JP | 2000134976 A | * 5/2000 | ............ H02P/6/12 |
| JP | 2001204190 A | * 7/2001 | ............ H02P/6/16 |
| JP | 2001208812 A | * 8/2001 | ............ G01R/31/34 |
| JP | 2001211698 A | * 8/2001 | ............ H02P/21/00 |
| JP | 2002262592 A | * 9/2002 | ............ H02P/6/18 |
| JP | 2002291281 A | * 10/2002 | ............ H02P/6/16 |

* cited by examiner

Primary Examiner—Edgardo San Martin
(74) Attorney, Agent, or Firm—Crowell & Moring LLP

(57) ABSTRACT

A synchronous motor controlling apparatus which can be applied to the carrier synchronized position estimating method as well and have protection-related functions such as detection of inverted magnetic pole position of a motor in a simple method, and an electric motor using the synchronous motor control apparatus. A controller controls a voltage applied to an AC motor with a PWM signal. A magnetic pole position detector of the controller detects a current of the AC motor to estimate a pole position of the AC motor. A fault detector detects a fault in the estimated magnetic position of the AC motor.

23 Claims, 16 Drawing Sheets

FORWARD POWER RUNNING

FORWARD
REGENERATION

PHASE INVERSION →

REVERSE REGENERATION

PHASE INVERSION

REVERSE POWER RUNNING

MOTOR CONTROL APPARATUS AND ELECTRIC VEHICLE USING SAME

BACKGROUND OF THE INVENTION

1. Field of the Invention

The present invention relates to a motor control apparatus and an electric motor using the same, and more particularly, to a motor control apparatus and an electric motor using the same which are suitable for use in a magnetic pole position estimation system for estimating a magnetic pole position of an alternating current (AC) synchronous motor.

2. Description of the Related Art

Generally, since the phase of an AC voltage applied to a synchronous motor is determined by a current magnetic pole position of a rotor, exact pole positions of the rotor are required for controlling the synchronous motor. A torque and speed of the synchronous motor can be controlled by conducting a current control or a voltage control based on the detected magnetic pole position. In recent years, a magnetic pole position sensor-less control system has been proposed for controlling a synchronous motor without using a position detector for detecting the magnetic pole position. Since a synchronous motor control apparatus based on the magnetic pole position sensor-less control system eliminates a position detector, the control apparatus could experience a problem of out-of-synchronism due to erroneous detection of magnetic pole position.

To solve this problem, for example, as described in JP-A-9-294390, a conventionally known synchronous motor control apparatus sets a determination level for an effective current value of a stator winding, and detects the out-of-synchronism when the effective current value of the stator winding exceeds the determination level, and a power factor angle between a voltage applied to the stator winding and a stator winding current reaches a value close to 90-.

Also, as described in JP-A-11-55994, a known synchronous motor control apparatus detects a phase difference between an output voltage and an induced voltage of a synchronous motor, calculates a difference between the frequency of an output voltage to the synchronous motor and the rotational speed of the synchronous motor from a changing rate of the detected phase difference value, and controls or changes the frequency of the output voltage to the synchronous motor by a frequency proportional to the calculated difference to prevent the out-of-synchronism.

However, the system described in JP-A-9-294390 requires complicated operations involved in calculating a square root for finding the effective current value of the stator winding of the motor and in calculating the power factor angle.

The control apparatus described in JP-A-11-55994, in turn, is applied to a system for estimating a magnetic pole position using an induced voltage generated by a motor, so that this control apparatus cannot be used in a carrier synchronized position estimating method which estimates a magnetic pole position of a rotor based on a current of the motor detected in synchronism with a carrier of a PWM signal.

SUMMARY OF THE INVENTION

It is an object of the present invention to provide a synchronous motor control apparatus and an electric vehicle using the same which have applications in the carrier synchronized position estimating method as well, and have protection-related functions such as detection of an inverted magnetic pole position of a motor in a simple method.

To achieve the above object, the present invention provides a motor control apparatus for controlling a voltage applied to an alternating current (AC) motor using a PWM signal. The motor control apparatus includes magnetic position estimating means for detecting a current of the AC motor to estimate a magnetic pole position of the AC motor, and fault detecting means for detecting a fault in an estimated magnetic pole position of the AC motor.

With the configuration described above, the motor control apparatus of the present invention can be applied to the carrier synchronized position estimating method as well and have protection-related functions such as detection of inverted magnetic pole position of a motor in a simple method.

Preferably, in the motor control apparatus, the fault detecting means includes means for calculating instantaneous power by multiplying a current value by a voltage value of each phase of the AC motor, such that the fault detecting means detects inversion of an estimated magnetic pole position by comparing the instantaneous power with power determined from a torque command and a rotational speed of the AC motor.

Preferably, in the motor control apparatus, the fault detecting means includes means for detecting an input voltage and an input current from a direct current (DC) power supply, such that the fault detecting means detects inversion of an estimated magnetic pole position by comparing power of the DC power supply with power determined from a torque command and a rotational speed of the AC motor.

Preferably, in the motor control apparatus, the fault detecting means includes means for detecting an input current from DC power supply, such that the fault detecting means detects inversion of an estimated magnetic pole position by comparing the sign of the DC current with power determined from a torque command and a rotational speed of the AC motor.

Preferably, in the motor control apparatus, the magnetic pole position estimating means applies an AC pulse voltage signal in a d-axis direction on a rotating coordinate system of the AC motor to estimate a magnetic pole position of the AC motor from a difference between a current generated when the AC pulse voltage signal is applied in a positive direction and a current generated when the AC pulse voltage signal is applied in a negative direction, and the fault detecting means detects inversion of an estimated magnetic pole position from a phase difference between a voltage command vector and the d-axis on the rotating coordinate system recognized by the control apparatus.

Preferably, in the motor control apparatus, the magnetic pole position estimating means applies an AC pulse voltage signal in a d-axis direction on a rotating coordinate system of the AC motor to estimate a magnetic pole position of the AC motor from a difference between a current generated when the AC pulse voltage signal is applied in a positive direction and a current generated when the AC pulse voltage signal is applied in a negative direction, and the fault detecting means detects inversion of an estimated magnetic pole position by comparing a voltage command vector on the q-axis on the rotating coordinate system with a rotating direction of the AC motor.

Preferably, in the motor control apparatus, the magnetic pole position estimating means applies an AC pulse voltage signal in a d-axis direction on a rotating coordinate system of the AC motor to estimate a magnetic pole position of the AC motor from a difference between a current generated when the AC pulse voltage signal is applied in a positive direction and a current generated when the AC pulse voltage signal is applied in a negative direction, and the fault detecting means detects inversion of an estimated magnetic pole position and out-of-synchronism by monitoring a current difference value on the d-axis on the rotational coordinate system.

Preferably, in the motor control apparatus, the magnetic pole position estimating means applies an AC pulse voltage signal in a d-axis direction on a rotating coordinate system of the AC motor to estimate a magnetic pole position of the AC motor from a difference between a current generated when the AC pulse voltage signal is applied in a positive direction and a current generated when the AC pulse voltage signal is applied in a negative direction, and the fault detecting means detects inversion of an estimated magnetic pole position and out-of-synchronism by monitoring a difference in the current differences on the d-axis on the rotating coordinate system.

Preferably, in the motor control apparatus, the fault detecting means detects oscillation, inversion and so on of an estimated magnetic pole position when a changing rate of the estimated magnetic pole position exceeds a predetermined set value.

Preferably, in the motor control apparatus, the fault detecting means includes rotational speed calculating means for calculating a rotational speed of the AC motor, such that the fault detecting means detects oscillation, inversion and so on of an estimated magnetic pole position when a calculated rotational speed exceeds a predetermined set value.

Preferably, in the motor control apparatus, the fault detecting means includes rotational speed calculating means for calculating a rotational speed of the AC motor, such that the fault detecting means detects oscillation, inversion and so on of an estimated magnetic pole position when a changing rate of a calculated rotational speed exceeds a predetermined set value.

Preferably, in the motor control apparatus, the magnetic pole position estimating means estimates a magnetic pole position of a rotor of the AC motor based on a current value of the AC motor detected in synchronism with a carrier of the PWM signal. The magnetic pole position estimating means includes position calculating means for estimating a magnetic pole position direction of the rotor of the AC motor, and polarity discriminating means for discriminating whether the magnetic pole position direction derived from the position calculating means is in an N-pole direction or in an S-pole direction. The fault detecting means determines a fault when the polarity discriminating means does not discriminate the magnetic pole position direction within a predetermined time period.

Preferably, in the motor control apparatus, the fault detecting means shuts down an associated system when the fault detecting means detects a fault, wherein the fault includes oscillation, inversion and so on of an estimated magnetic pole position.

Preferably, in the motor control apparatus, the polarity discriminating means again corrects the polarity to continue a control when the fault detecting means detects a fault, wherein the fault includes oscillation, inversion and so on of an estimated magnetic pole position.

In addition, to achieve the above object, the present invention provides an electric vehicle equipped with a motor control apparatus for controlling a voltage applied to an alternating current (AC) motor using a PWM signal. The motor control apparatus includes magnetic position estimating means for detecting a current of the AC motor to estimate a magnetic pole position of the AC motor, and fault detecting means for detecting a fault in an estimated magnetic pole position of the AC motor.

DETAILED DESCRIPTION OF THE EMBODIMENTS

To begin with, the configuration and operation of a synchronous motor control apparatus according to a first embodiment of the present invention will be described with reference to FIGS. 1 through 5.

Figure 1:
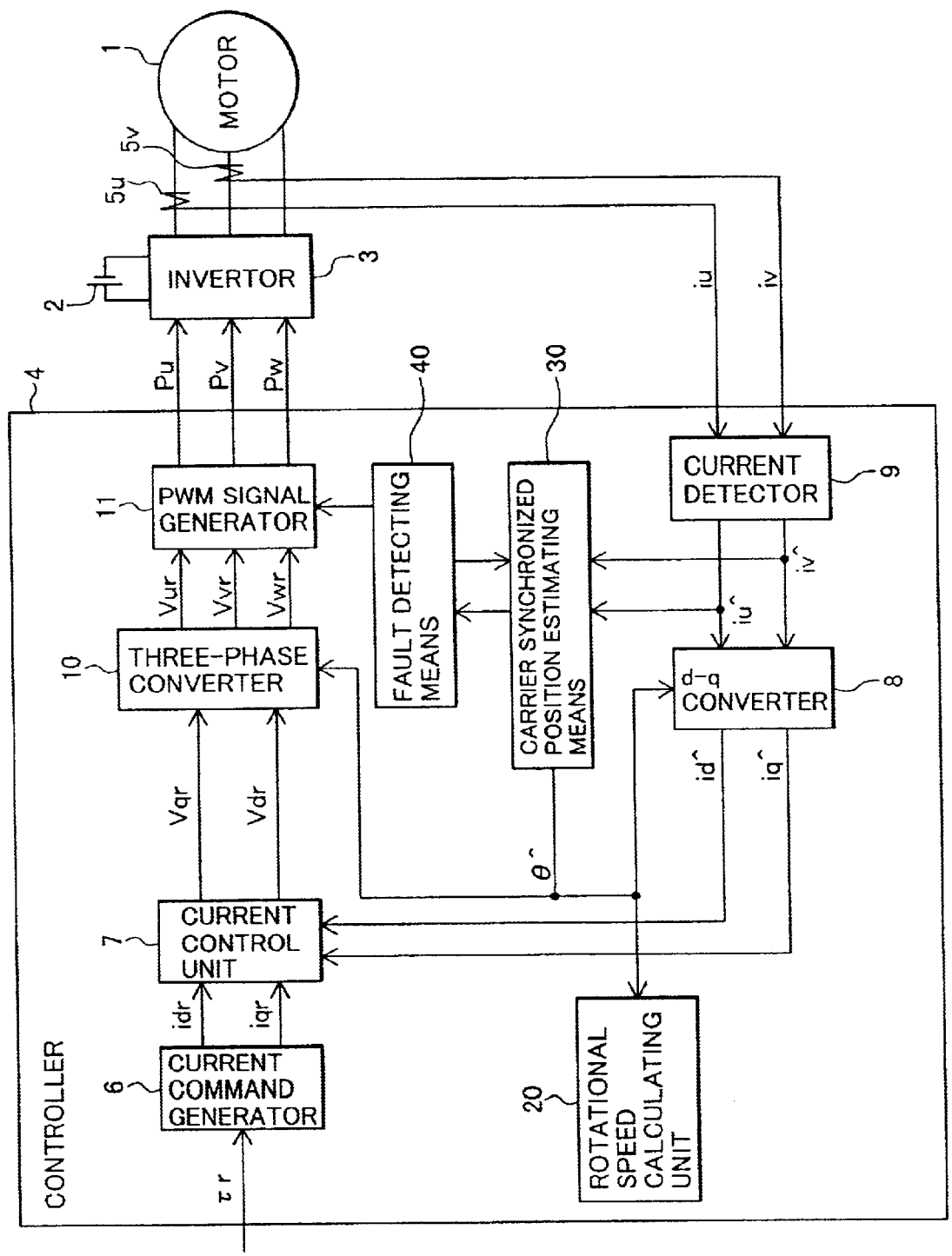
FIG. 1 is a block diagram illustrating the configuration of the synchronous motor control apparatus according to the first embodiment of the present invention.
Figure 2:
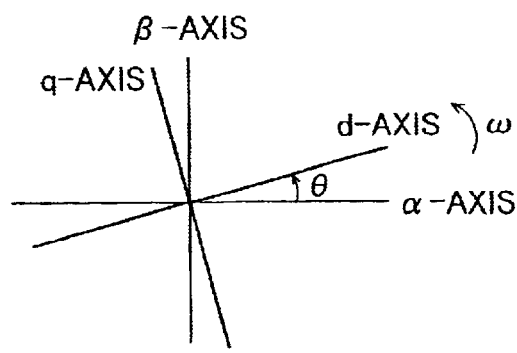
FIG. 2 is an explanatory diagram of a rotating coordinate system for use in the synchronous motor control apparatus of FIG. 1.

FIG. 1 is a block diagram illustrating the configuration of the synchronous motor control apparatus according to the first embodiment of the present invention, and FIG. 2 is an explanatory diagram of a rotating coordinate system for use in the synchronous motor control apparatus of FIG. 1.

A direct current (DC) voltage from a battery 2 is converted to three-phase AC voltages by an invertor 3, and applied to an AC synchronous motor 1. The applied voltage is calculated and determined by a controller 4.

The controller 4 comprises a current command generator 6, a current control unit 7, a d-q converter 8, a current detector 9, a three-phase converter 10, a PWM signal generator 11, a rotational speed calculating unit 20, a carrier type magnetic pole position estimating means 30, and a fault detector 40.

The current command generator 6 in the controller 4 determines a d-axis current command value idr and a q-axis current command value iqr for a torque command value r which should be generated by the motor 1. Here, the d-axis indicates the direction of a magnetic pole position (magnetic flux), while the q-axis indicates the direction orthogonal to the d-axis, thus defining a rotating coordinate system (d-q axes). The relationship between the rotating coordinate system (d-q axes) and a static coordinate system ($\alpha$-$\beta$ axes) is shown in FIG. 2.

Since the controller 4 of the first embodiment constitutes a current control system on the d-q axes, values fed back to the current control unit 7 are a d-axis current detection value id^ and a q-axis current detection value iq^ which are calculated by converting in the d-q converter 8 the coordinate system of a u-phase current iu and a v-phase current iv detected by the current detector 9 using current sensors 5u, 5v, respectively. The current control unit 7 controls control voltages Vdr, Vqr such that the d-axis current detection value id^ and q-axis current detection value iq^ match the current command values idr, iqr, respectively. The three-phase converter 10 converts the control voltages Vdr, Vqr to three-phase control voltages Vur, Vvr, Vwr based on a magnetic pole position estimated by the carrier type position estimating means 30. The PWM signal generator 11 outputs PWM signals Pu, Pv, Pw to the invertor 3 based on the three-phase control voltages Vur, Vvr, Vwr outputted by the three-phase converter 10.

As a rotor of the motor 1 having permanent magnets rotates at an angular velocity, the d-q axes also rotate at the angular velocity, so that it is necessary to detect the phase from the static coordinate system ($\alpha$-$\beta$ axes) to the rotating coordinate system (d-q axes), i.e., a magnetic pole position for controlling a current on the d-q axes. In the first embodiment, the carrier synchronized magnetic pole position estimating means 30 estimates the magnetic pole position using the u-phase current iu^ and v-phase current iv^, which are motor currents, detecting by the current detector 9, without using a position sensor. A signal indicative of the estimated magnetic pole position is supplied to the d-q converter 8, rotational speed calculating unit 20 and three-phase converter 10, respectively.

The fault detector 40 detects that a fault such as inversion, out-of-synchronism, oscillation occurs by some cause in the magnetic position estimating means 30. Also, the fault detector 40 sends a fault signal to the PWM signal generator 11 when it detects a fault to stop the PWM signal to shut down the system. When the system need not be shut down, the motor 1 may be restarted to return to a normal state, thereby continuing the control.

Next, the configuration and operation of the carrier synchronized position estimating means for use in the first embodiment will be described with reference to FIGS. 3 and 4.

Figure 3:
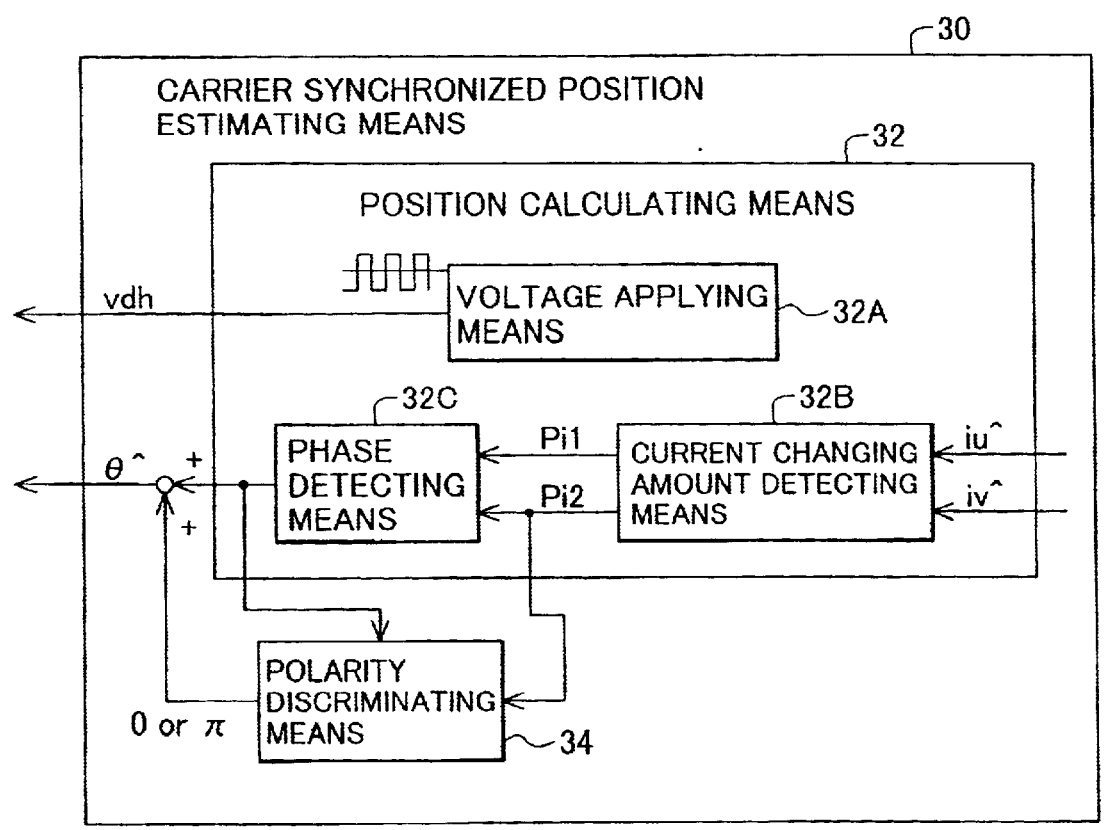
FIG. 3 is a block diagram illustrating the configuration of a carrier synchronized position estimating means for use with the synchronous motor control apparatus according to the first embodiment of the present invention.
Figure 4:
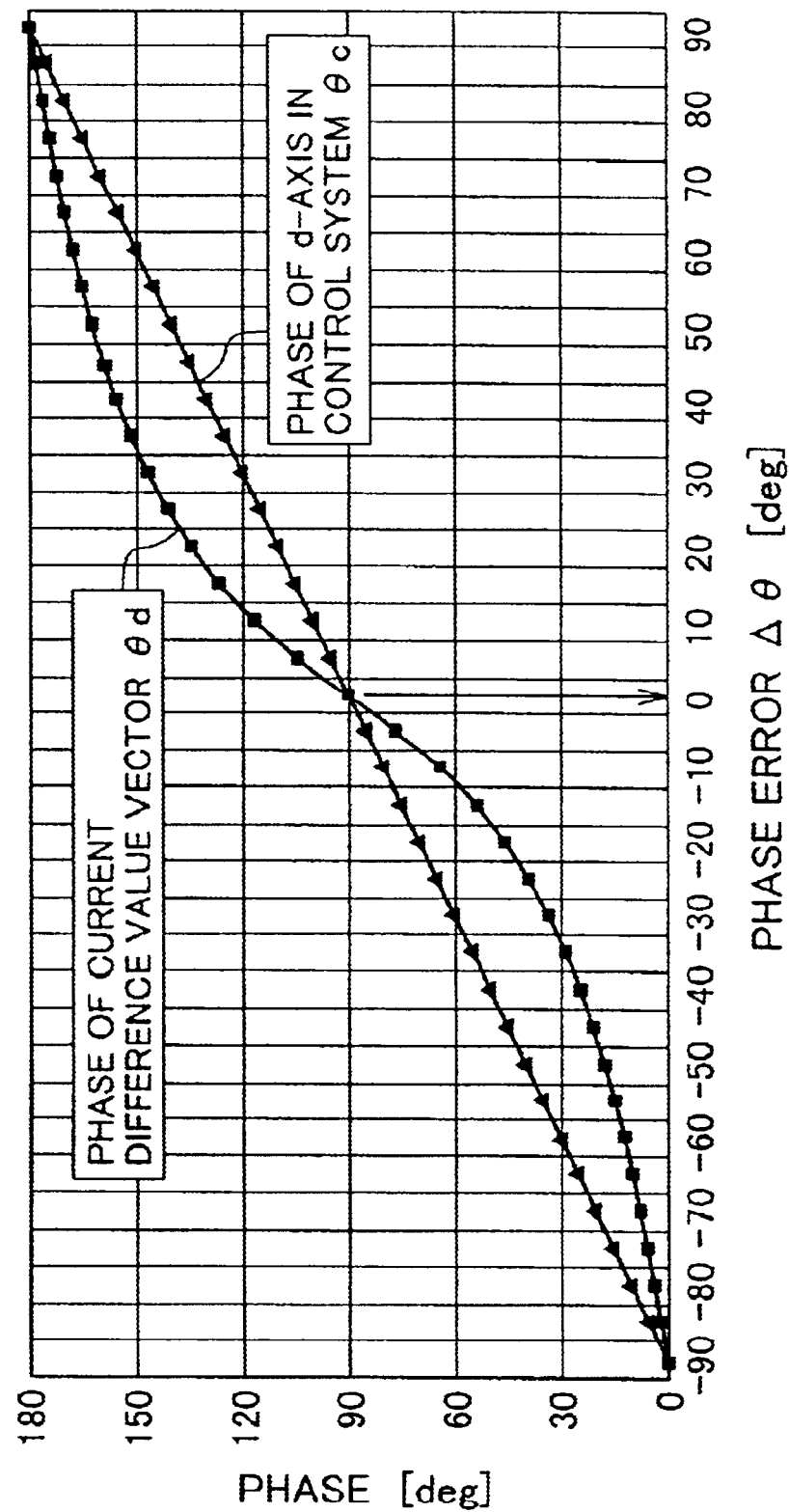
FIG. 4 is an explanatory diagram showing the relationship between a phase d of a current difference vector and a phase c of the d-axis in the control system in the position estimating means for use with the synchronous motor control apparatus according to the first embodiment of the present invention.

FIG. 3 is a block diagram illustrating the configuration of the carrier synchronized position estimating means 30 for use with the synchronous motor control apparatus according to the first embodiment of the present invention, and FIG. 4 is an explanatory diagram showing the relationship between a phase d of a current difference vector and a phase c of the d-axis in the control system in the position estimating means 30.

As illustrated in FIG. 3, a carrier synchronized magnetic pole position estimating means 30 comprises a position calculating means 32 and a polarity discriminating means 34. The position calculating means 32 in turn includes a voltage applying means 32A, a current changing amount detecting means 32B, and a phase detecting means 32C.

The position calculating means 32 in the magnetic pole position estimating means 30, which is in principle based on the saliency (Ld≠Lq), applies a voltage pulse vdh for position estimation in the direction of the d-axes (c) in the control system (direction of estimated magnetic pole position $\emptyset^\lambda$ Representing the difference between a current difference value in a positive (+) potential section of a pulse generated by applying this voltage pulse vdh and a current difference value in a negative (−) potential section of the pulse (hereinafter the difference in the current difference value between the positive potential section and the negative potential section is referred to as the "current difference disparity) as a vector, the phase d of the current difference disparity and the phase c of the d-axis in the control system are defined in a relationship as shown in FIG. 4. As shown in FIG. 4, when the phase d of the current difference disparity vector generated by applying the voltage pulse is made identical to the phase c of the d-axis in the control system., the difference between the magnetic pole position of the motor and the phase c of the d-axis in the control system, i.e., a positional error is zero. In other words, the magnetic pole position can be estimated.

The position calculating means 32 estimates the magnetic pole position using the foregoing principle. The voltage applying means 32A applies the voltage pulse vdh for position estimation in a c direction to the d-axis in the control system, and the current changing amount detecting means 32B detects motor current difference vectors Pi1, Pi2 for a positive potential section and a negative potential section generated by the voltage pulse vdh. Then, the phase detecting means 32C calculates a vector phase d which is the difference between the motor current difference vectors Pi1, Pi2, and makes the vector phase d identical to the phase c of the d-axis in the control system. In the foregoing manner, the magnetic pole position is estimated.

The voltage pulse vdh for position estimation applied in the carrier synchronized position estimating means 30 should be at a highest possible frequency in view of vibrations and noise. In the first embodiment, the frequency of the applied voltage pulse vdh for position estimation is chosen to be the same frequency as a PWM carrier of the invertor. Thus, the controller 4 fetches a motor current in synchronism with the PWM carrier, and calculates a current difference value between the positive potential section and the negative potential section of the voltage pulse.

As described above, the carrier synchronized position estimating means 30 applies the voltage pulse vdh at the same frequency as the PWM carrier, fetches the motor current in synchronism with the PWM carrier, and calculates the current difference value generated by applying the voltage pulse vdh, thereby making it possible to estimate the magnetic pole position with high responsibility, low noise and few torque ripple. In addition, since the carrier synchronized position estimating means 30 relies on the inductance characteristic of the motor, the magnetic pole position can be accurately estimated not only during middle and high speed operations of the motor but also during stopping and low speed operations of the motor in which the induced voltage is generally difficult to detect.

It should be noted however that since the inductance of a synchronous motor having a saliency changes at a period of 180° of the magnetic pole position, the magnetic pole position can be estimated by the magnetic pole estimating method based on the inductance over a limited range of 180°. Therefore, the carrier synchronized position estimating means 30 cannot determine whether a resulting estimated magnetic pole position direction is in the N-pole direction (−) or in the S-pole direction (+) at the time the motor is started. To overcome this inconvenience, the carrier synchronized position estimating means 30 comprises a polarity discriminating means 34 for discriminating the polarity of an estimated magnetic pole position.

The polarity discriminating means 34 determines the polarity of a position upon starting of the motor. One example of the polarity discriminating means 34 employs the magnetic saturation characteristic of the motor. The polarity discriminating means 34 according to the first embodiment discriminates the polarity based on the difference between the value of inductance generated when a positive current is supplied in the d-axis direction of the synchronous motor and the value of inductance generated when a negative current is supplied. Specifically, since the magnetic flux is established by permanent magnets embedded in a rotor in a permanent magnet synchronous motor, smaller inductance is generated due to magnetic saturation when the positive current is supplied even if the positive and negative currents of the same magnitude are supplied in the d-axis direction. The polarity discriminating means 34 makes use of this characteristic. Since the carrier synchronized magnetic pole position estimating means 30 applies the voltage pulse vdh for position estimation in the estimated magnetic pole position direction, the polarity discriminating means 34 supplies a current for discriminating the polarity in the d-axis direction in the control system, and calculates a d-axis current difference value generated by the voltage pulse vdh to find the inductance on the d-axis.

Next, a method of starting the motor control apparatus according to the first embodiment will be described with reference to FIG. 5.

Figure 5:
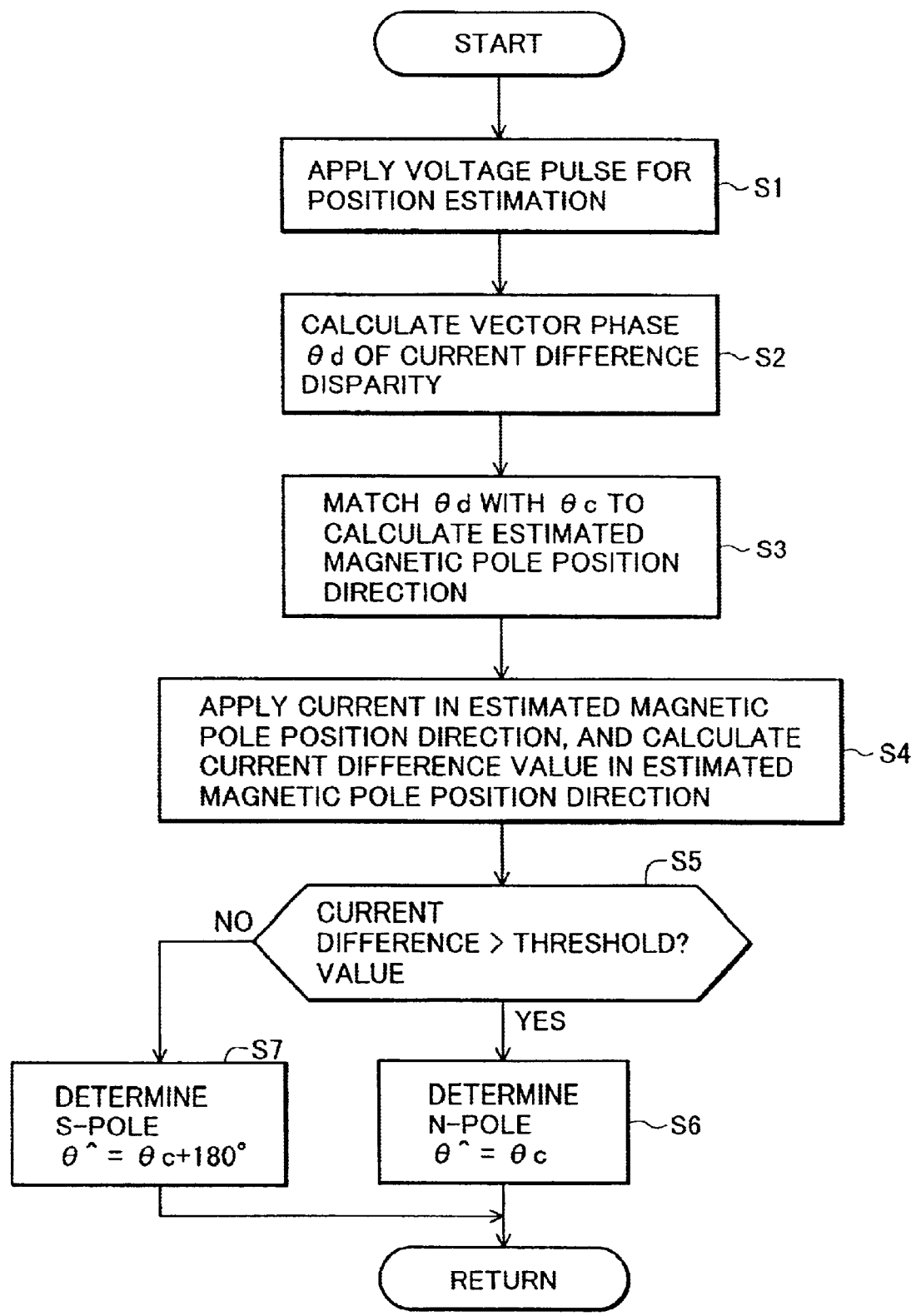
FIG. 5 is a flow chart illustrating the method of starting the synchronous motor control apparatus according to the first embodiment of the present invention.

FIG. 5 is a flow chart illustrating the method of starting the synchronous motor control apparatus according to the first embodiment of the present invention.

While the carrier synchronized magnetic pole position estimating means 30 of the first embodiment is capable of estimating the magnetic pole position over a wide range from an inoperative state to a high speed operation, the magnetic pole position estimating means 30 principally relies on the inductance characteristic of the motor, so that it cannot discriminate whether the position estimated at the start of the motor corresponds to the N-pole direction (−direction) or the S-pole direction (+direction).

At step S1 in FIG. 5, the carrier synchronized magnetic pole position estimating means 30 applies the voltage pulse vdh for position estimation synchronized to the PWM carrier in the d-axis direction in the control system at the start of the motor.

Next, at step S2, the estimating means 30 calculates a vector phase d of a current difference disparity between the positive potential section and the negative potential section of the voltage pulse vdh.

Then, at step S3, the estimating means 30 matches the vector phase d of the current difference disparity with the phase c of the d-axis in the control system to calculate an estimated magnetic polarity position.

Since the polarity is still unknown at this time, the estimating means 30 further supplies a predetermined positive current in the previously found estimated magnetic pole position direction to calculate the value of a current difference in the d-axis direction in the control system generated by the voltage pulse vdh at step S4.

In continuation, at step S5, the estimating means 30 compares the current difference value calculated at step S4 with a previously set threshold.

At steps S6, S7, the estimating means 30 discriminates the polarity of the estimated magnetic polarity position direction based on the result of comparison at step S5. Specifically, at step S6, if the current difference value in the d-axis direction in the control system is larger than the threshold, the estimating means 30 determines the N pole since Ld is similar, and defines the d-axes direction in the control system as an estimated magnetic pole position $\emptyset^\lambda$. On the other hand, at step S7, if the current difference value in the d-axes direction in the control system is smaller than the threshold, the estimating means 30 determines the S pole since Ld is larger, and corrects the d-axis direction in the control system by 180° to define corrected direction as an estimated magnetic pole position $\emptyset^\lambda$.

Described above is the operation of the carrier synchronized magnetic pole position estimating means 30 at the start of the motor. In this magnetic pole position estimating means, the threshold at step S5 may include hysteresis such that a fault is determined if current difference value does not indicate the N pole or the S pole for a certain set time period, thereby making it possible to find a fault in the system at the stage of starting.

It should be noted that the polarity discriminating means 34 is not limited to the one described above. For example, the polarity discriminating means 34 may supply currents in the positive and negative directions along the d-axis in the control system, compare a current difference value generated by the voltage pulse when the current is supplied in the positive direction with a current difference value generated by the voltage pulse when the current is supplied in the negative direction, and discriminate the polarity based on the result of comparison. Further, in the foregoing description, the current supplied in the estimated magnetic pole position direction has such a magnitude that causes the magnetic saturation. Alternatively, a smaller current may be supplied as long as such currents cause a difference in Ld detected by the voltage pulse when such a smaller current is supplied in the positive direction and in the negative direction. Also, since an induced voltage is generated when the motor is rotating at the time of starting, the polarity can be discriminated from a change in current when the motor is in an equi-potential state, i.e., when the motor is short-circuited. As previously described, since the equi-potential state of the motor exists in a normal PWM control, the equi-potential state need not be additionally generated. In this event, when a change in current in the equi-potential state is smaller than a predetermined value, the polarity is discriminated taking advantage of the magnetic saturation characteristic, on the assumption that the motor is in a low speed range.

After the carrier synchronized magnetic position estimating means 30 determines the estimated magnetic pole position $Ø^\lambda$ at the time of starting, the polarity need not be discriminated in principle. The estimation of position can be continued only with the position calculating means 32 except for the polarity determining means 34, after the motor is started. However, then the motor is not in operation, the polarity discriminating means 34 may be operated at predetermined time intervals to check the polarity of the currently estimated magnetic pole position $Ø^\lambda$ for effectively preventing the inversion of the polarity. If this check shows that the polarity determined by the polarity discriminating means 34 differs from the polarity of the currently estimated magnetic polarity position $Ø^\lambda$, the polarity should be corrected. In this way, even if the polarity of the estimated magnetic pole position $Ø^\lambda$ has been inverted by some cause while the motor is not in operation, the polarity can be promptly corrected.

In the first embodiment, when inversion of the estimated magnetic pole position, out-of-synchronism, oscillation and so on are detected, the system may be shut down regarding that a fault has occurred. Also, when the estimated magnetic pole position is inverted, the polarity discriminating means 34 may be used to again discriminate the polarity, and return to the normal magnetic pole position for continuing the control.

While the first embodiment employs motor currents in two phases, i.e., U-phase and V-phase, any combination of two out of three phases including the W-phase current may be used. In addition, all of the three phases may be detected to use three-phase currents.

Also, while the first embodiment shows a torque control system in which the controller is supplied with a torque command, a speed control system and a position control system may be provided at levels higher than the torque control system without any hinderance. When a speed control system is provided, a motor speed estimated value m^ calculated from the amount of change in estimated magnetic pole position over time in the rotational speed calculating unit 20 may be used as a speed feedback value.

As described above, the synchronous motor control apparatus according to the first embodiment can be applied to the carrier synchronized position estimating method as well and have protection-related functions such as detection of inverted magnetic pole position of a motor in a simple method.

Next, the configuration and operation of a synchronous motor control apparatus according to a second embodiment of the present invention will be described with reference to FIGS. 6 and 7.

Figure 6:
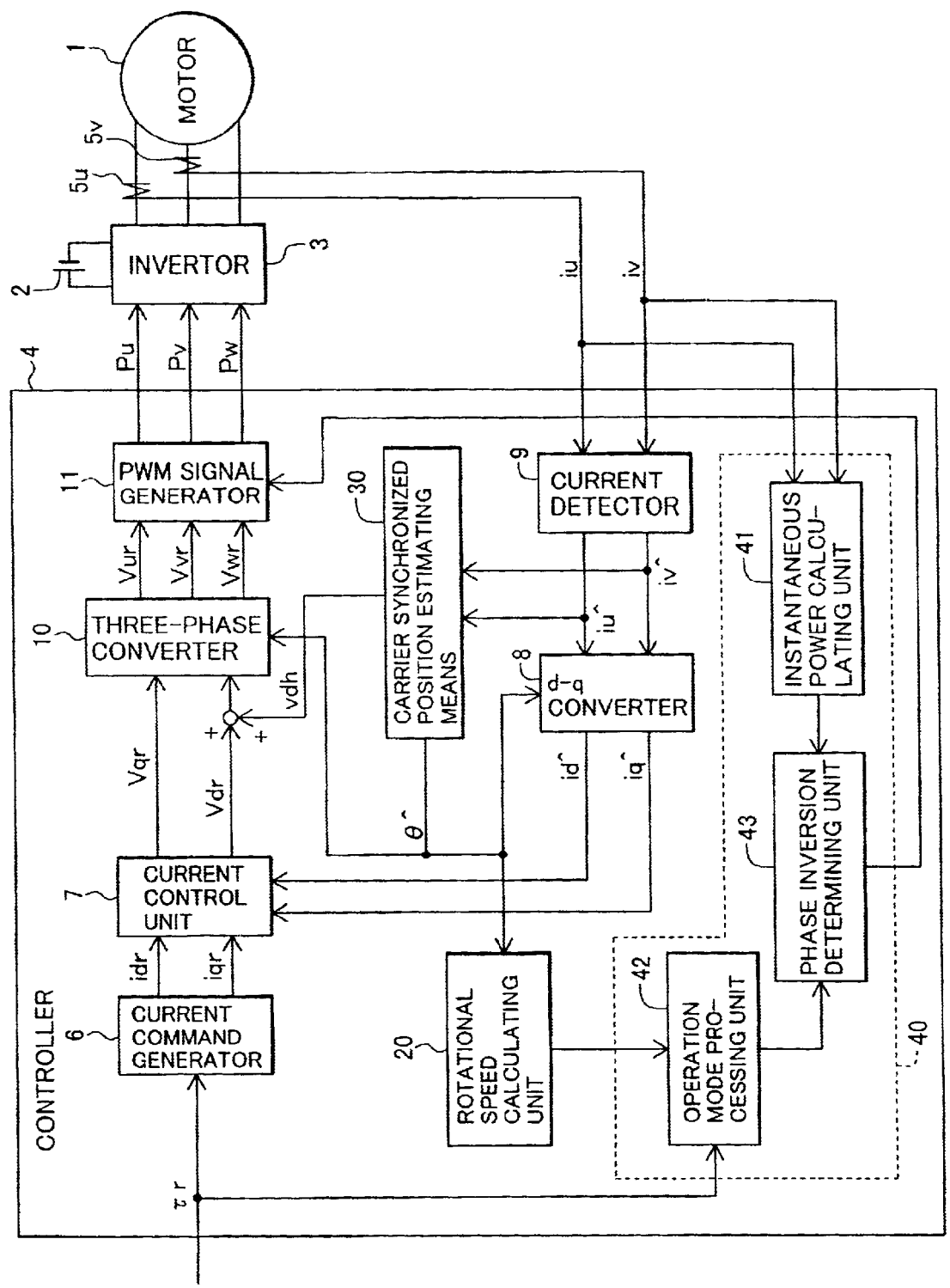
FIG. 6 is a block diagram illustrating the configuration of the synchronous motor control apparatus according to a second embodiment of the present invention.

FIG. 6 is a block diagram illustrating the configuration of the synchronous motor control apparatus according to the second embodiment of the present invention, where the same reference numerals as those in FIG. 1 designate the same components.

A fault detecting means 40 comprises an instantaneous power calculating unit 41, an operation mode processing unit 42, and a phase inversion determining unit 43. The magnetic pole position can be estimated by the magnetic pole position estimating means 30 over a limited range of 180-, so that if an estimated magnetic pole position has been inverted by some cause by 180-, the inversion of the position is detected by a fault detecting means 40.

The instantaneous power calculating unit 41 calculates the output instantaneous power of the motor by the following equation (1):

$$P=vu^*\ddagger iu^\wedge+vv^*\ddagger iv^\wedge+vw^*\ddagger iw^\wedge \qquad (1)$$

where vu* is a u-phase voltage command value, and iu^ is a u-phase detected current value. The same is applied to the v-phase and w-phase as well. From equation (1), current instantaneous power can be known. Also, if actual voltages of the u-, v- w-phases can be measured, the actual voltages may be used instead of the voltage command. The actual input/output relationship can be known from this instantaneous power.

An operation mode which is to be currently operated can be found in the operation mode processing unit 42 from a torque command r and a estimated motor speed m outputted from the rotational speed calculating unit 20.

Here, the relationship between the operation mode and the power will be described with reference to FIG. 7.

Figure 7:
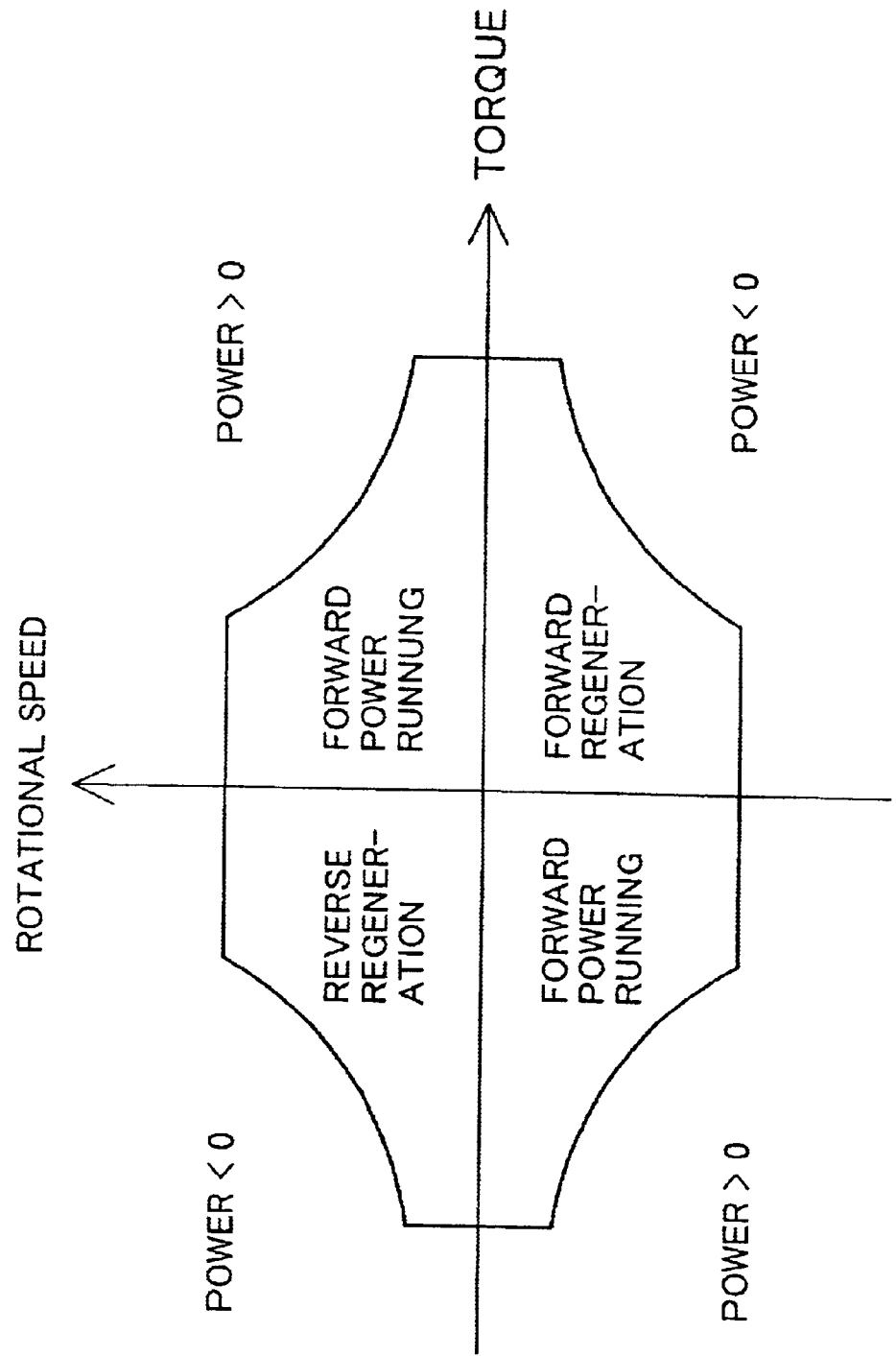
FIG. 7 is an explanatory diagram showing the relationship between the operation mode and the power in the synchronous motor control apparatus according to the second embodiment of the present invention.

FIG. 7 is an explanatory diagram showing the relationship between the operation mode and the power in the synchronous motor control apparatus according to the second embodiment of the present invention.

As shown in FIG. 7, assuming that an estimated magnetic pole position is inverted, an operation mode to be currently operated is in unmatched input/output relationship with the instantaneous power. Therefore, the phase inversion determining unit 43 relies on the input/output relationship between an operation mode determined by the operation mode processing unit 42 and the instantaneous power calculated by the instantaneous power calculating unit 41 to determine that an estimated magnetic pole position is inverted.

As described above, the synchronous motor control apparatus according to the second embodiment can be applied to the carrier synchronized position estimating method as well and have protection-related functions such as detection of inverted magnetic pole position of a motor in a simple method.

Next, the configuration and operation of a synchronous motor control apparatus according to a third embodiment of the present invention will be described with reference to FIG. 8.

Figure 8:
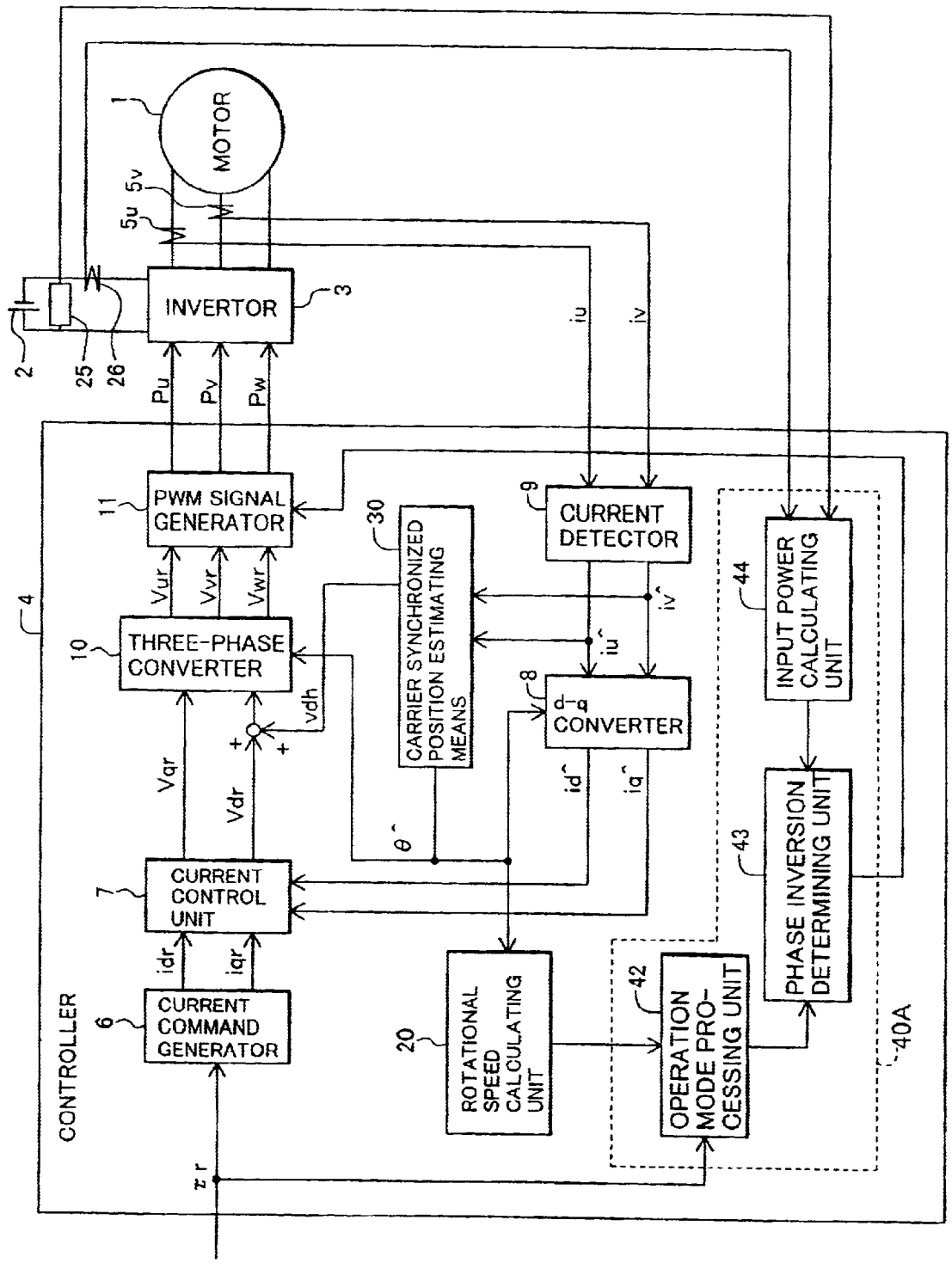
FIG. 8 is a block diagram illustrating the configuration of the synchronous motor control apparatus according to a third embodiment of the present invention.

FIG. 8 is a block diagram illustrating the configuration of the synchronous motor control apparatus according to the third embodiment of the present invention, where the same reference numerals as those in FIGS. 1, 6 designate the same components.

In the third embodiment, a fault detector 40A comprises an input power calculating unit 44 instead of the instantaneous power calculating unit 41 illustrated in FIG. 6. The input power calculating unit 44 calculates input power from a product of a DC voltage VB of a battery 2 detected by a resistor 25 and a DC current IB detected by a current sensor 26. A phase inversion determining unit 43 relies on the input/output relationship between an operation mode determined by the operation mode processing unit 42 and the input power calculated by the input power calculating unit 44 to determine that an estimated magnetic pole position is inverted.

When the DC voltage is a constant positive voltage, an actual input/output relationship may be known only with the sign of the DC current.

As described above, the synchronous motor control apparatus according to the third embodiment can be applied to the carrier synchronized position estimating method as well and have protection-related functions such as detection of inverted magnetic pole position of a motor in a simple method.

Next, the configuration and operation of a synchronous motor control apparatus according to a fourth embodiment of the present invention will be described with reference to FIGS. 9 through 13.

Figure 9:
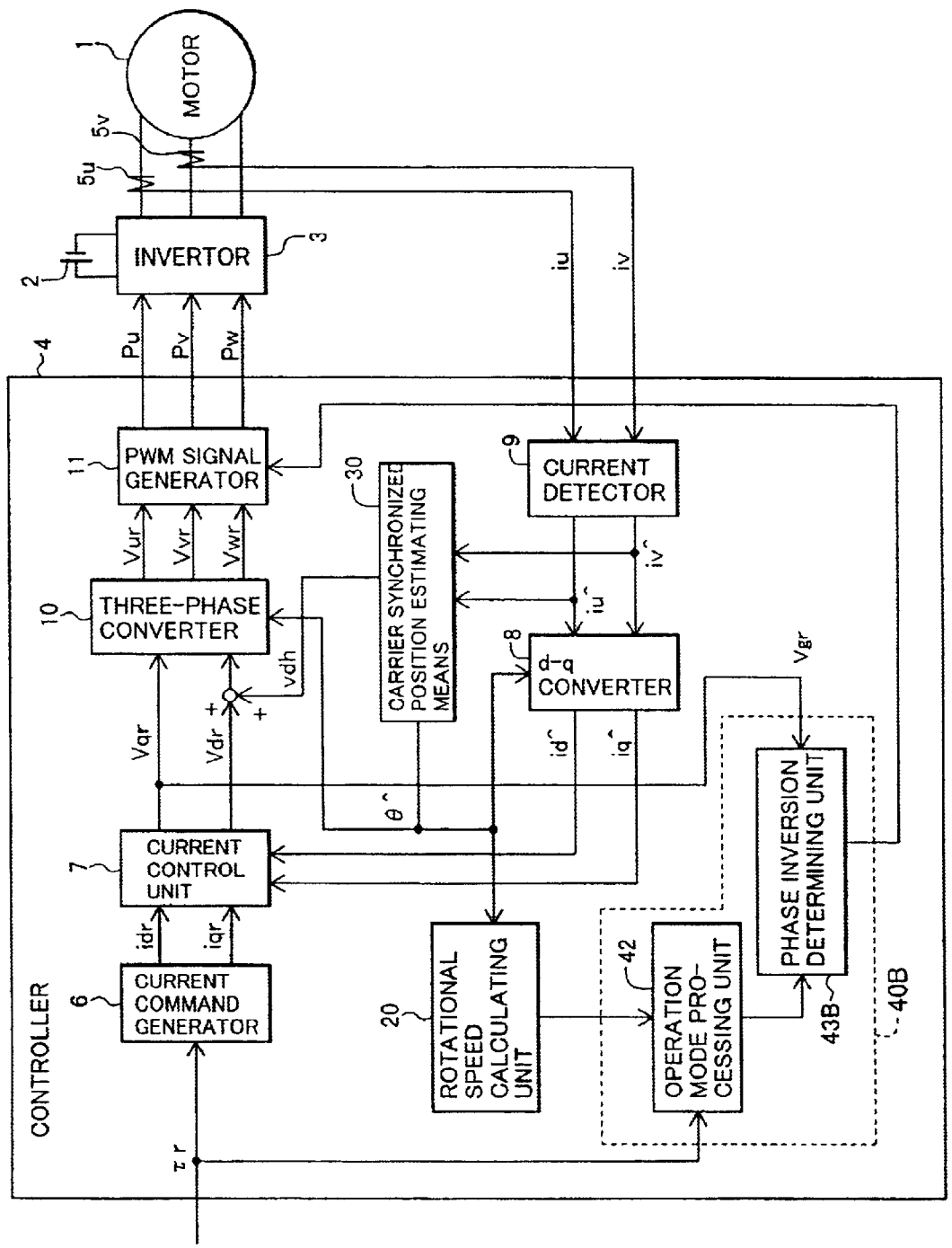
FIG. 9 is a block diagram illustrating the configuration of the synchronous motor control apparatus according to a fourth embodiment of the present invention.

FIG. 9 is a block diagram illustrating the configuration of the synchronous motor controller according to the fourth embodiment of the present invention, where the same reference numerals as those in FIGS. 1, 6, 8 designate the same components.

A fault detector 40B comprises an operation mode processing unit 42 and a phase inversion determining unit 43B. The phase inversion determining unit relies on a relationship between an operation mode determined by the operation mode processing unit 42 and a voltage outputted by a current control unit 7 to determine that an estimated magnetic pole position is inverted.

Figure 10A:
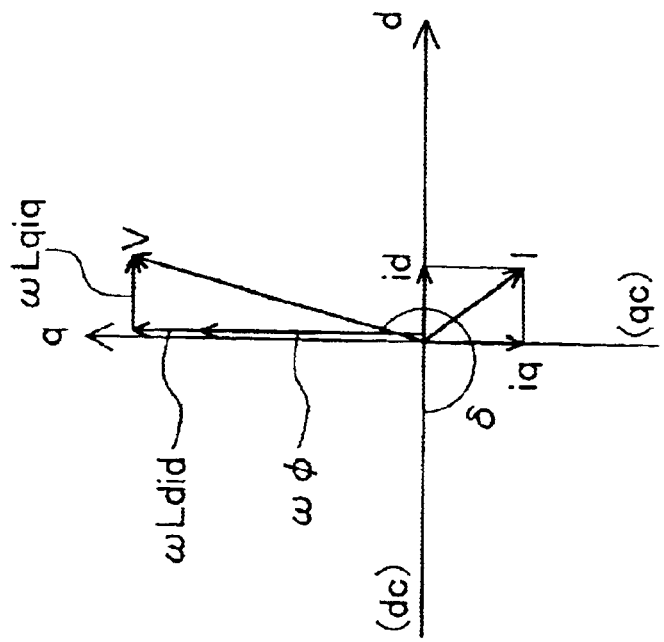
FIGS. 10A, 10B are vector diagrams for forward power running for describing the operation of the synchronous motor control apparatus according to the fourth embodiment of the present invention.
Figure 10B:
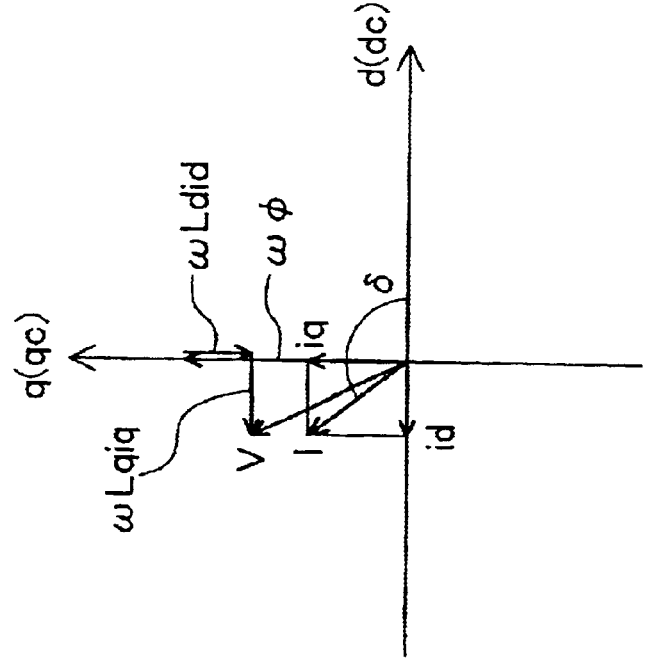

FIGS. 10A, 10B are vector diagrams for forward power running for describing the operation of the synchronous motor control apparatus according to the fourth embodiment of the present invention. FIG. 10A shows a normal vector for forward power running, while FIG. 10B shows a vector when the estimated magnetic pole position is inverted.

During the forward power running, i.e., normal operation, a voltage vector is represented in a fourth quadrant by an induced voltage of the motor and weak field control as shown in FIG. 10A. Also, the d-axis recognized by the controller 4 matches the actual d-axis, wherein the phase of the voltage vector with respect to the d-axis is in a range of 90- to 180-. In this event, assuming that the estimated magnetic position is inverted by some cause, the d-axis recognized by the controller 4 is inverted by 180- from the actual d-axis. Also, current commands on the d-, q-axes are reverse to the actual axe. Therefore, as shown in FIG. 10B, the current vector is represented in a second quadrant. The voltage vector is represented in a first quadrant since the direction of the q-axis current command is inverted.

Here, the phase of the actual voltage vector with respect to the d-axis recognized by the controller 4 is in a range of 180- to 270-, as shown in FIG. 10A. Therefore, the phase inversion detector 43B determines whether or not the estimated magnetic pole position is inverted by monitoring the relationship between the d-axis recognized by the controller 4 and the phase of the actual voltage vector.

Figure 11B:
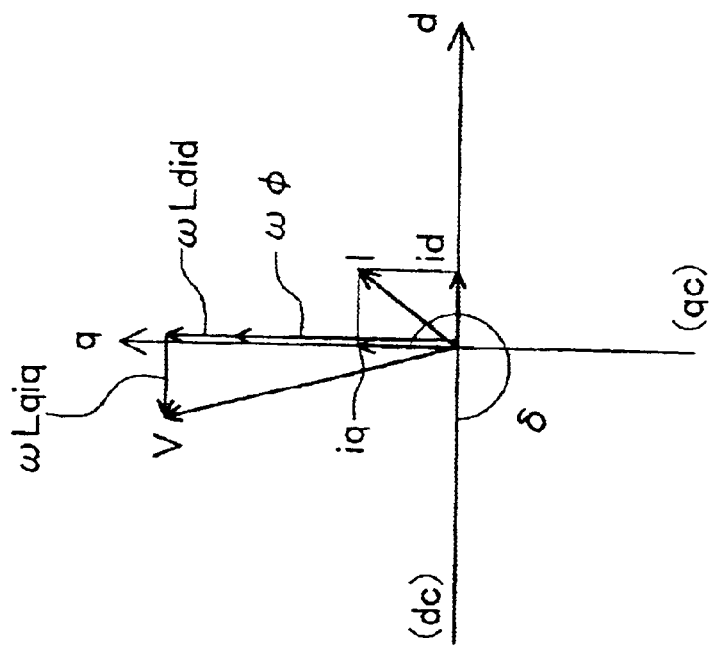
FIGS. 11A, 11B are vector diagrams for forward regeneration for describing the operation of the synchronous motor control apparatus according to the fourth embodiment of the present invention.
Figure 11A:
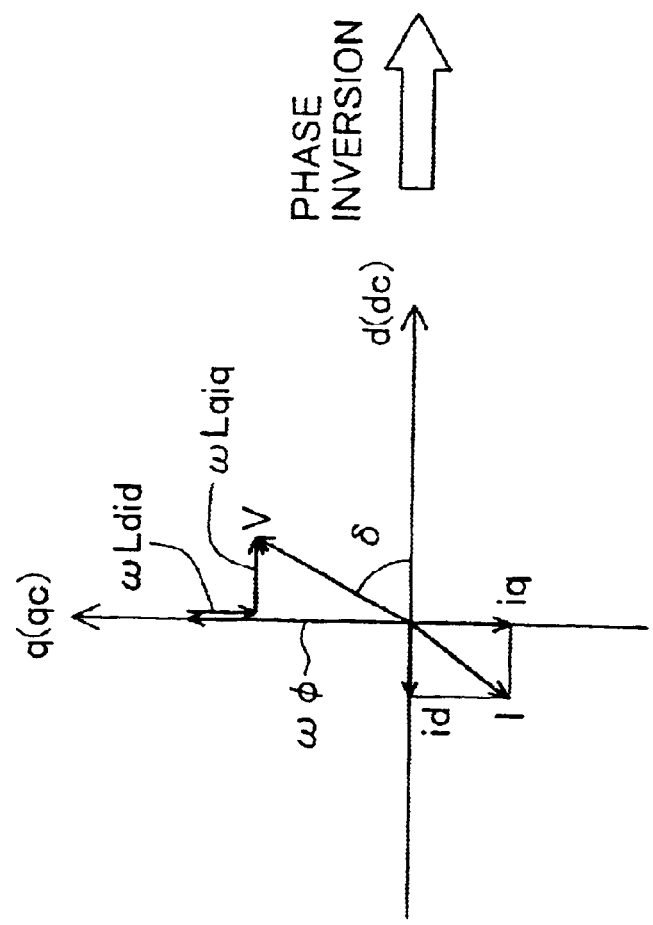

FIGS. 11A, 11B are vector diagrams for forward regeneration for describing the operation of the synchronous motor controller according to the fourth embodiment of the present invention. FIG. 11A shows a normal vector for forward regeneration, and FIG. 11B shows a vector when an estimated magnetic pole position is inverted.

Similarly to FIGS. 10A, 10B, the phase is normally in a range of 0- to 90- for the forward regeneration, but in a range of 270- to 360- when the estimated magnetic pole position is inverted. Likewise for reverse regeneration, the phase when the estimated magnetic pole position is normal is different from that when the estimated magnetic pole position is inverted, thereby making it possible to determine that the estimated magnetic pole position is inverted.

Figure 12B:
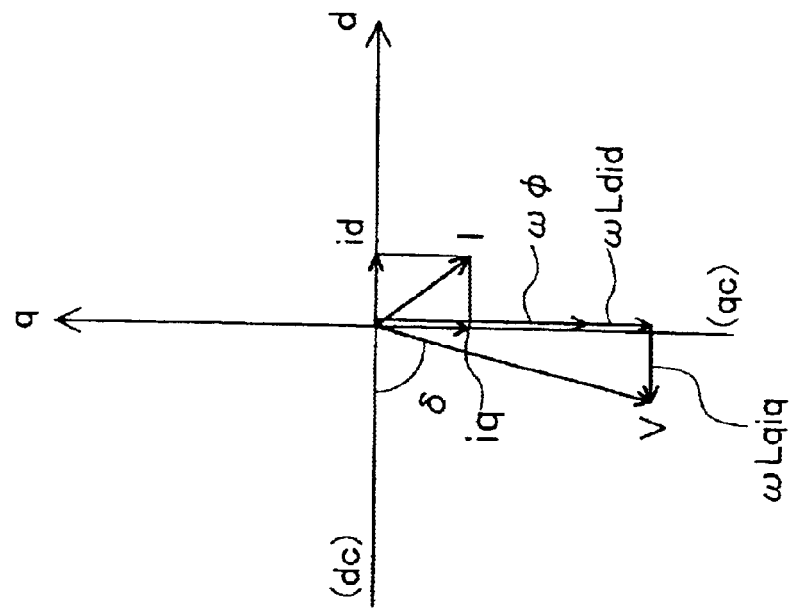
FIGS. 12A, 12B are vector diagrams for reverse regeneration for describing the operation of the synchronous motor control apparatus according to the fourth embodiment of the present invention.
Figure 12A:
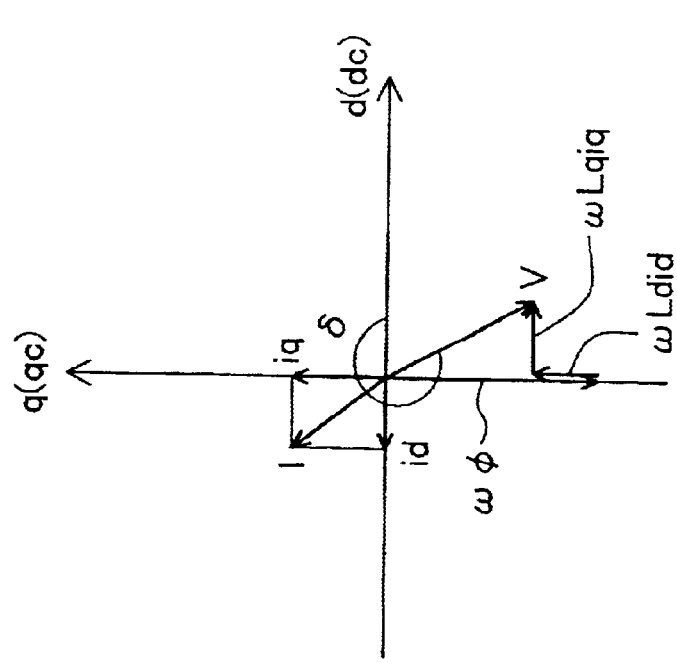

FIGS. 12A, 12B are vector diagrams for reverse regeneration for describing the operation of the synchronous motor controller according to the fourth embodiment of the present invention. FIG. 12A shows a normal vector for the reverse regeneration, while FIG. 12 shows a vector when an estimated magnetic pole position is inverted.

Similarly to FIGS. 10A, 10B, the phase when the estimated magnetic pole position is normal is different from that when the estimated magnetic pole position is inverted, thereby making it possible to determine, for the reverse regeneration as well, that the estimated magnetic pole position is inverted.

Figure 13B:
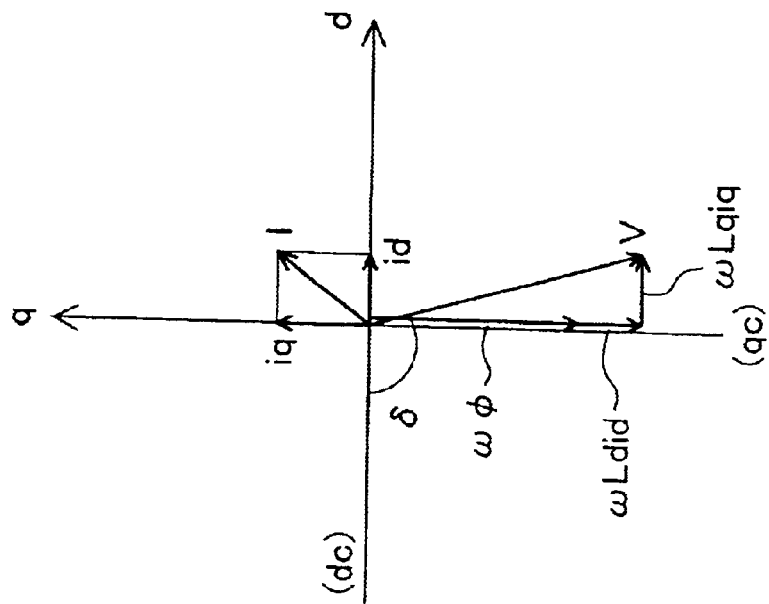
FIGS. 13A, 13B are vector diagram for reverse power running for describing the operation of the synchronous motor control apparatus according to the fourth embodiment of the present invention.
Figure 13A:
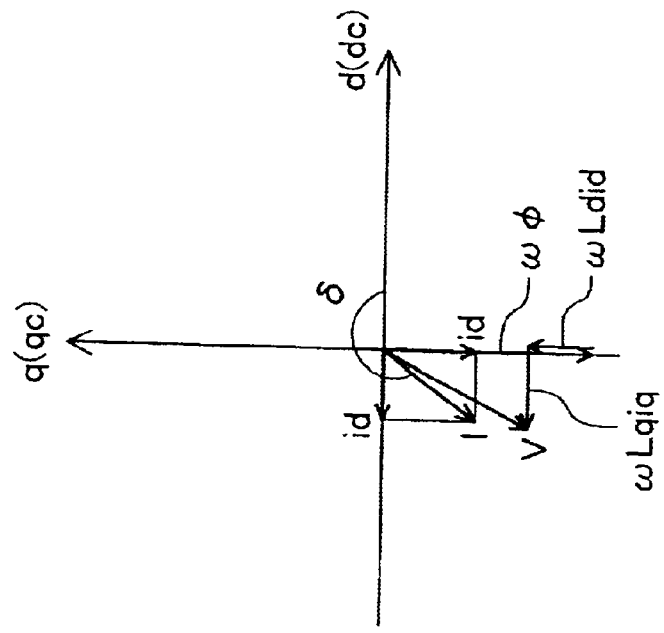

FIGS. 13A, 13B are vector diagram for reverse power running for describing the operation of the synchronous motor control apparatus according to the fourth embodiment of the present invention. FIG. 13A shows a normal vector for the reverse power running, while FIG. 13B shows a vector when an estimated magnetic pole position is inverted.

Similarly to FIGS. 10A, 10B, the phase when the estimated magnetic pole position is normal is different from that when the estimated magnetic pole position is inverted, thereby making it possible to determine, for the reverse power running as well, that the estimated magnetic pole position is inverted.

Paying attention to the q-axis voltage command which is a q-axis component of a voltage command vector, the q-axis voltage command is in the positive direction when the motor is forwardly rotated and in the negative direction when the motor is reversely rotated since it is normally affected largely by an induced voltage. However, if the estimated magnetic pole position is inverted by some cause, the q-axis voltage is represented in the same direction since the rotating direction of the motor remains unchanged, whereas the q-axis voltage command is recognized in the reverse direction since the phase recognized by the controller 4 is inverted. By taking advantage of this relationship to monitor the rotating direction of the motor and the sign of the q-axis voltage command, it is possible to determine whether or not an estimated magnetic pole position is inverted.

As described above, the synchronous motor control apparatus according to the fourth embodiment can be applied to the carrier synchronized position estimating method as well and have protection-related functions such as detection of inverted magnetic pole position of a motor in a simple method.

Next, the configuration and operation of a synchronous motor control apparatus according to a fifth embodiment of the present invention will be described with reference to FIGS. 14 and 15.

Figure 14:
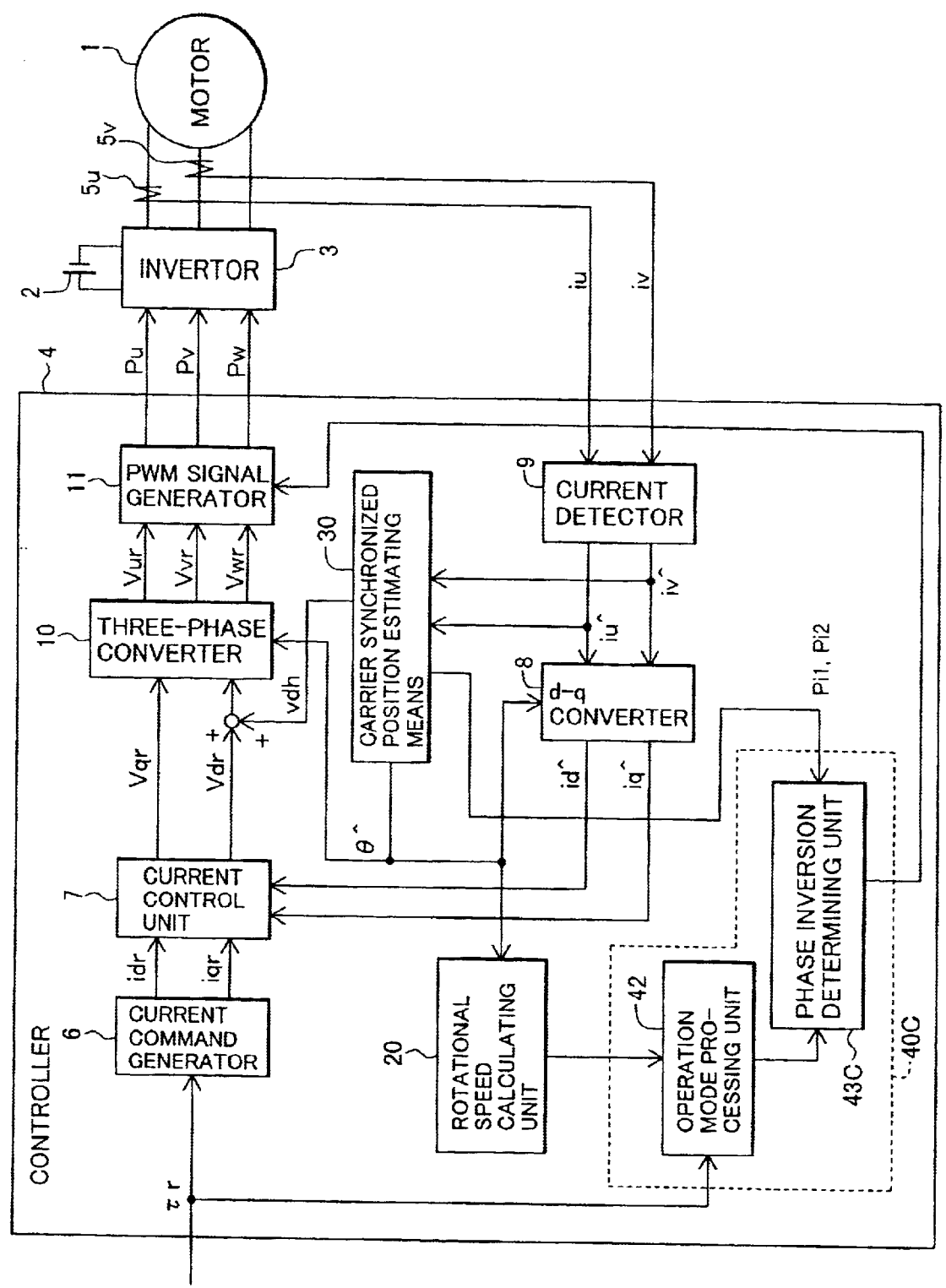
FIG. 14 is a block diagram illustrating the configuration of the synchronous motor control apparatus according to a fifth embodiment of the present invention.

FIG. 14 is a block diagram illustrating the configuration of the synchronous motor control apparatus according to the fifth embodiment of the present invention, where the same reference numerals as those in FIGS. 1, 6, 8, 9 designate the same components.

A fault detector 40C comprises an operation mode processing unit 42 and a phase inversion determining unit 43C. The phase inversion determining unit 43C relies on the relationship between an operation mode determined by the operation mode processing unit 42 and current difference values Pi1, Pi2 outputted from a magnetic pole position estimating means 30 to determine that an estimated magnetic pole position is inverted.

The phase inversion determining unit 43C estimates a magnetic pole position from the current difference values which are generated by applying a voltage pulse for magnetic pole position estimation. Since the current difference is generated by the inductance of the motor, the current difference value differs when the voltage pulse is applied in the d-axis direction and when the voltage pulse is applied in the q-axis direction for a salient synchronous motor which has inductance Ld on the d-axis different from inductance Ld on the q-axis. Since the salient synchronous motor exhibits a relationship expressed by Ld<Lq, a larger current difference is generated when the voltage pulse is applied on the d-axis than when applied on the q-axis.

Figure 15:
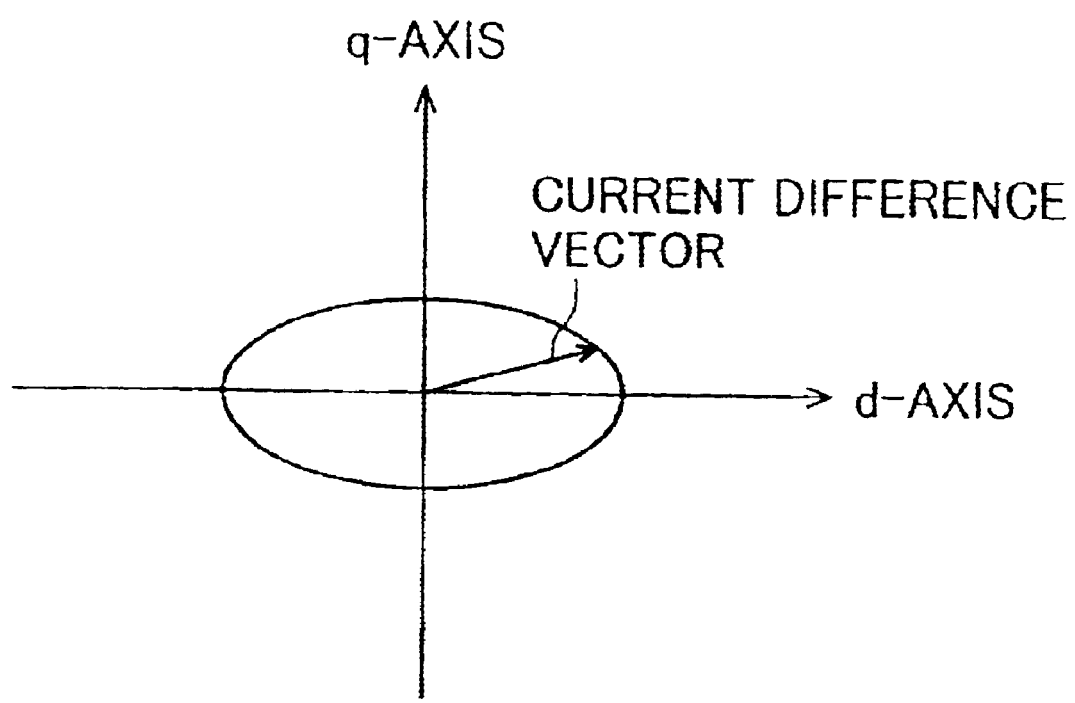
FIG. 15 is an explanatory diagram of a vector trajectory of the current difference value in the synchronous motor controller according to the fifth embodiment of the present invention.

FIG. 15 is an explanatory diagram of a vector trajectory of the current difference value in the synchronous motor control apparatus according to the fifth embodiment of the present invention. FIG. 15 shows a vector trajectory of the current difference value on the d-q axes.

When an estimated magnetic pole position is correct, the current difference value presents a large value since the voltage pulse is applied in the d-axis direction. However, if the estimated magnetic pole position is shifted by some cause, the voltage pulse intended for application in the d-axis direction is also applied in the q-axis direction. Further, when the estimated magnetic pole position is shifted by 90-, the voltage pulse is fully applied to the q-axis direction. Since the current difference value becomes smaller when the voltage pulse is applied in the q-axis direction, a shift in the estimated magnetic pole position can be detected by monitoring the current difference value. In addition, since the direction in which the voltage pulse is applied also passes the q-axis direction, shifted by 90- from the d-axis when the estimated magnetic pole position is inverted, the shift can be sensed before the estimated magnetic pole position is completely inverted. It is therefore possible to prevent the inversion at an earlier timing.

Alternatively, the inversion of the estimated magnetic pole position, out-of-synchronism, shift and so on can be detected using a current difference disparity instead of the current difference value.

As described above, the synchronous motor control apparatus according to the fifth embodiment can be applied to the carrier synchronized position estimating method as well and have protection-related functions such as detection of inverted magnetic pole position of a motor in a simple method.

Next, the configuration and operation of a synchronous motor control apparatus according to a sixth embodiment will be described with reference to FIG. 16.

Figure 16:
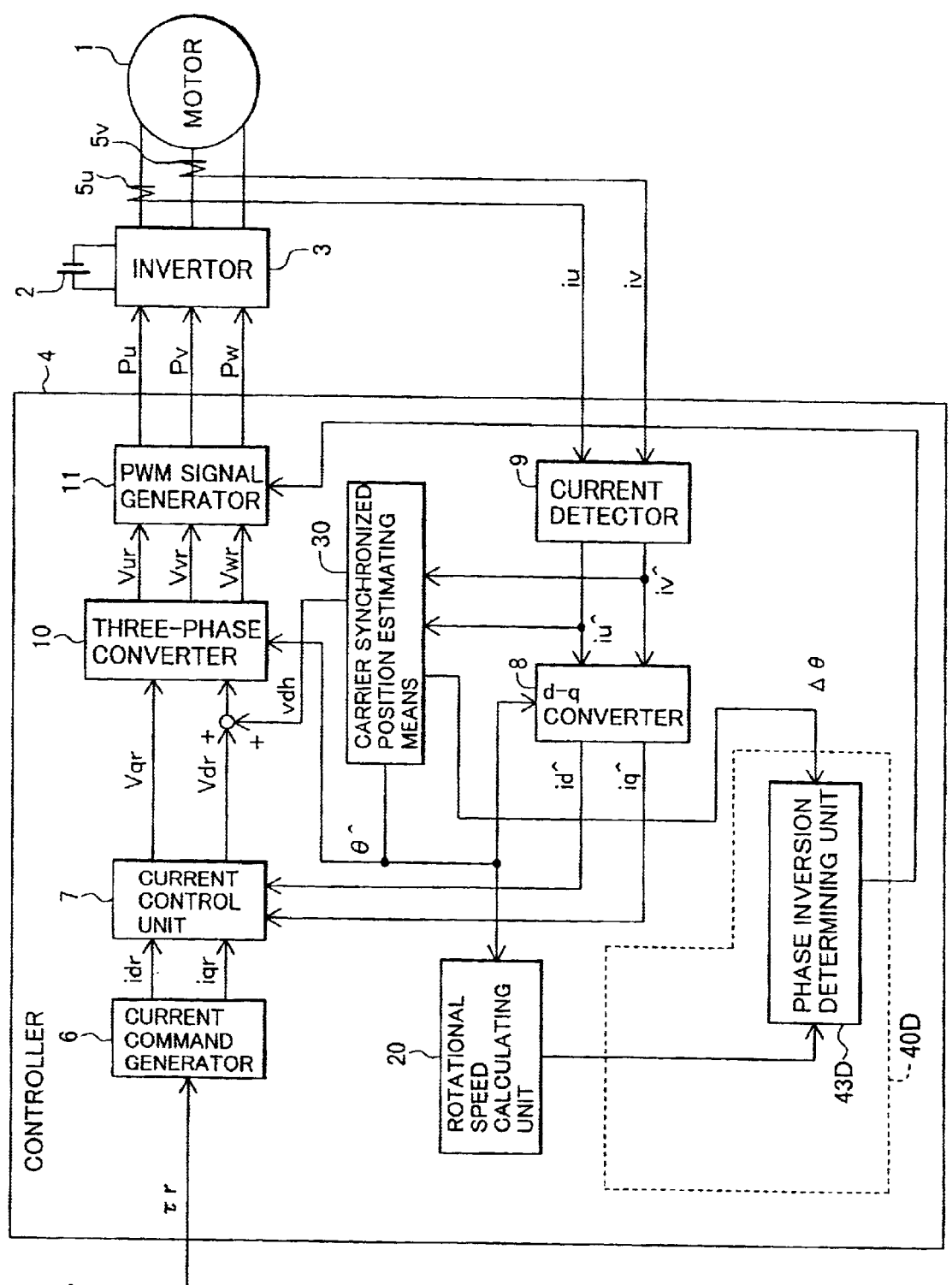
FIG. 16 is a block diagram illustrating the configuration of the synchronous motor control apparatus according to a sixth embodiment of the present invention.

FIG. 16 is a block diagram illustrating the configuration of the synchronous motor control apparatus according to the sixth embodiment of the present invention, where the same reference numerals as those in FIGS. 1, 6, 8, 9 designate the same components.

A fault detector 40D comprises a phase inversion determining unit 43D. The phase inversion determining unit 43 D determines that the estimated magnetic pole position is inverted, in relation to a changing rate As of an estimated magnetic pole position outputted by a magnetic pole position estimating means 30.

The carrier synchronized position estimating means 30 may experience, by some cause, inversion of estimated magnetic pole position, out-of-synchronization, and oscillation of the estimated magnetic pole position. To detect this oscillation, the phase inversion determining unit 43D monitors a changing rate $\Delta\emptyset$ of the estimated magnetic pole position. Since the magnetic pole position may vary in a maximum operating frequency range, the oscillation or the like, if any, would result in an extremely large changing rate of the estimated magnetic pole position. It is therefore possible to detect the oscillation when the changing rate exceeds a certain set value, which is determined from the maximum operating frequency.

Also, since a larger changing rate of the estimated magnetic pole position results in a higher estimated rotational speed, oscillation of estimated magnetic pole position can be found when the estimated rotational speed exceeds the maximum operating frequency. Furthermore, monitoring the changing rate of the estimated rotational speed is effective in sensing the oscillation of estimated magnetic pole position.

Since the oscillation of estimated magnetic pole position is a phenomenon which could occur in any magnetic pole position estimating method, this method of detecting the oscillation of estimated magnetic pole position is effective in any magnetic pole position estimating methods using any approaches.

Next, an electric vehicle using the motor control apparatus according to any of the foregoing embodiments will be described with reference to FIG. 17.

Figure 17:
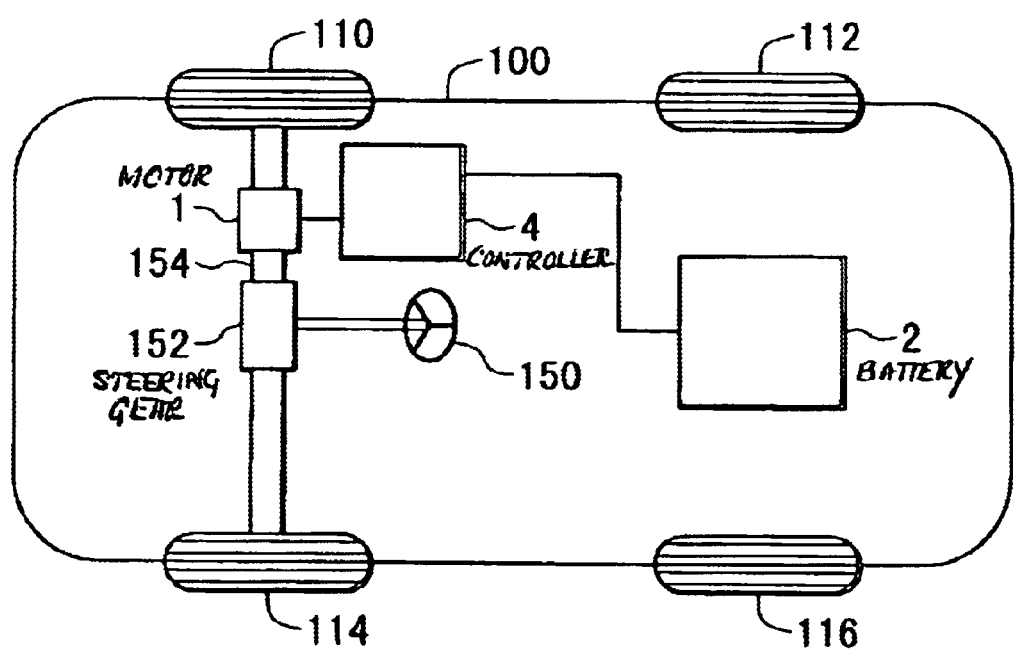
FIG. 17 is a block diagram illustrating the configuration of the electric vehicle which is equipped with the motor control apparatus according to one embodiment of the present invention.

FIG. 17 is a block diagram illustrating the configuration of the electric vehicle which is equipped with the motor control apparatus according to one embodiment of the present invention, where the same reference numerals as those in FIG. 1 designate the same components.

A body 100 of the electric vehicle is supported by four wheels 110, 112, 114, 116. Since the illustrated electric vehicle is forward-wheel driven, a motor 1 is directly coupled to a front axle 154. A controller 4 controls a driving torque of the motor 1. A battery 2 is provided as a power source for the controller 4. The power from the battery 2 is supplied to the motor 1 through the controller 4 to drive the motor 1, and rotate the wheels 110, 114. The rotation of a steeling wheel 150 is transmitted to the two wheels 110, 114 through a transmission mechanism comprised of a steering gear 152, a tie rod, knuckle are, and so on to change the angle of the wheels.

The control apparatus according to the respective embodiments can be applied to any motor control apparatus intended for a permanent magnet synchronous motor irrespective of applications. Among others, the present invention is particularly suitable for electric vehicles and hybrid vehicles. This is because the system free of position sensors is effective in reducing the cost, and elimination of attachment, adjustment and maintenance of the sensor is particularly effective for an apparatus having a complicated structure. When any of the embodiments is applied to an electric vehicle or a hybrid vehicle, it is possible to employ a magnetic pole position estimating means which generates relatively large noise when a motor is stopped or running at a low speed and a magnetic pole position estimating means which generates no noise when the motor is running at a middle or high speed. In this way, an electric vehicle or a hybrid vehicle, which hardly generates noise when it is stopped or running at a low speed, can let walkers be conscious of the vehicle, thereby making it possible to ensure the safety.

As appreciated from the foregoing description, the synchronous motor controlling apparatus according to the present invention can be applied to the carrier synchronized position estimating method as well and have a protection function such as detection of inverted magnetic pole position of a motor in a simple method.

What is claimed is:

1. A motor apparatus for controlling a voltage applied to an alternating current (AC) motor using a PWM signal, comprising:

magnetic position estimating means for detecting a current of said AC motor to estimate a magnetic pole position of said AC motor; and fault detecting means for detecting a fault in an estimated magnetic pole position of said AC motor estimated by said magnetic position estimating means.

2. A motor control apparatus for controlling a voltage applied to an alternating current (AC) motor using a PWM signal, comprising:

magnetic position estimating means for detecting a current of said AC motor to estimate a magnetic pole position of said AC motor; and fault detecting means for detecting a fault in an estimated magnetic pole position of said AC motor, wherein:

said fault detecting means includes means for calculating instantaneous power by multiplying a current value by a voltage value of each phase of said AC motor, such that said fault detecting means detects inversion of an estimated magnetic pole position by comparing the instantaneous power with power determined from a torque command and a rotational speed of said AC motor.

3. A motor control apparatus for controlling a voltage applied to an alternating current (AC) motor using a PWM signal, comprising:

magnetic position estimating means for detecting a current of said AC motor to estimate a magnetic pole position of said AC motor; and fault detecting means for detecting a fault in an estimated magnetic pole position of said AC motor, wherein:

said fault detecting means includes means for detecting an input voltage and an input DC current from a direct current (DC) power supply, such that said fault detecting means detects inversion of an estimated magnetic pole position by comparing power of said D power supply with power determined from a torque command and a rotational speed of said AC motor.

4. A motor control apparatus for controlling a voltage applied to an alternating current (AC) motor using a PWM signal, comprising:

magnetic position estimating means for detecting a current of said AC motor to estimate a magnetic pole position of said AC motor; and fault detecting means for detecting a fault in an estimated magnetic pole position of said AC motor, wherein:

said fault detecting means includes means for detecting an input DC current from DC power supply, such that said fault detecting means detects inversion of an estimated magnetic pole position by comparing the sign of the DC current with power determined from a torque command and a rotational speed of said AC motor.

5. A motor control apparatus for controlling a voltage applied to an alternating current (AC) motor using a PWM signal, comprising:

magnetic position estimating means for detecting a current of said AC motor to estimate a magnetic pole position of said AC motor; and fault detecting means for detecting a fault in an estimated magnetic pole position of said AC motor, wherein:

said magnetic pole position estimating means applies an AC pulse voltage signal in a d-axis direction on a rotating coordinate system of said AC motor to estimate a magnetic pole position of said AC motor from a difference between a current generated when the AC pulse voltage signal is applied in a positive direction and a current generated when the AC pulse voltage signal is applied in a negative direction; and said fault detecting means detects inversion of an estimated magnetic pole position from a phase difference between a voltage command vector and the d-axis on the rotating coordinate system recognized by said control apparatus.

6. A motor control apparatus for controlling a voltage applied to an alternating current (AC) motor using a PWM signal, comprising:

magnetic position estimating means for detecting a current of said AC motor to estimate a magnetic pole position of said AC motor; and fault detecting means for detecting a fault in an estimated magnetic pole position of said AC motor, wherein:

said magnetic pole position estimating means applies an AC pulse voltage signal in a d-axis direction on a rotating coordinate system of said AC motor to estimate a magnetic pole position of said AC motor from a difference between a current generated when the AC pulse voltage signal is applied in a positive direction and a current generated when the AC pulse voltage signal is applied in a negative direction; and said fault detecting means detects inversion of an estimated magnetic pole position by comparing a voltage command vector on the q-axis on the rotting coordinate system with a rotating direction of said AC motor.

7. A motor control apparatus for controlling a voltage applied to an alternating current (AC) motor using a PWM signal, comprising:

magnetic position estimating means for detecting a current of said AC motor to estimate a magnetic pole position of said AC motor; and fault detecting means for detecting a fault in an estimated magnetic pole position of said AC motor, wherein:

said magnetic pole position estimating means applies an AC pulse voltage signal in a d-axis direction on a rotating coordinate system of said AC motor to estimate a magnetic pole position of said AC motor from a difference between a current generated when the AC pulse voltage signal is applied in a positive direction and a current generated when the AC pulse voltage signal is applied in a negative direction; and said fault detecting means detects inversion of an estimated magnetic pole position and out of synchronism by monitoring a current difference value on the d-axis on the rotational coordinate system.

8. A motor control apparatus for controlling a voltage applied to an alternating current (AC) motor using a PWM signal, comprising:

magnetic position estimating means for detecting a current of said AC motor to estimate a magnetic pole position of said AC motor; and fault detecting means for detecting a fault in an estimated magnetic pole position of said AC motor, wherein:

said magnetic pole position estimating means applies an AC pulse voltage signal in a d-axis direction on a rotating coordinate system of said AC motor to estimate a magnetic pole position of said AC motor from a difference between a current generated when the AC pulse voltage signal is applied in a positive direction and a current generated when the AC pulse voltage signal is applied in a negative direction; and said fault detecting means detects inversion of an estimated magnetic pole position and out-of-synchronism by monitoring a difference between the current differences on the d-axis on the rotating coordinate system.

9. A motor control apparatus for controlling a voltage applied to an alternating current (AC) motor using a PWM signal, comprising:

magnetic position estimating means for detecting a current of said AC motor to estimate a magnetic pole position of said AC motor; and fault detecting means for detecting a fault in an estimated magnetic pole position of said AC motor, wherein:

said fault detecting means detects oscillation and inversion of an estimated magnetic pole position when a changing rate of the estimated magnetic pole position exceeds a predetermined set value.

10. A motor apparatus controlling a voltage applied to an alternating current (AC) motor using a PWM signal, comprising:

magnetic position estimating means for detecting a current of said AC motor to estimate a magnetic pole position of said AC motor; and fault detecting means for detecting a fault in an estimated magnetic pole position of said AC motor, wherein:

said fault detecting means includes rotational speed calculating means for calculating a rotational speed of said AC motor, such that said fault detecting means detecting oscillation and inversion of an estimated magnetic pole position when a calculated rotational speed exceeds an predetermined set value.

11. A motor control apparatus for controlling a voltage applied to an alternating current (AC) motor using a PWM signal, comprising:

magnetic position estimating means for detecting a current of said AC motor to estimate a magnetic pole position of said AC motor; and fault detecting means for detecting a fault in an estimated magnetic pole position of said AC motor, wherein:

said fault detecting means includes rotational speed calculating means for calculating a rotational speed of said AC motor, such that said fault detecting means detects oscillation and inversion of an estimated magnetic pole position when a changing rate of a calculated rotational speed exceeds a predetermined set value.

12. A motor control apparatus for controlling a voltage applied to an alternating current (AC) motor using a PWM signal, comprising:

magnetic position estimating means for detecting a current of said AC motor to estimate a magnetic pole position of said AC motor; and fault detecting means for detecting a fault in an estimated magnetic pole position of said AC motor, wherein:

said magnetic pole position estimating means estimates a magnetic pole position of a rotor of said AC motor based on a current value of said AC motor detected in synchronism with a carrier of the PWM signal;

said magnetic pole position estimating means includes:

position calculating means for estimating a magnetic pole position direction of the rotor of said AC motor; and polarity discriminating means for discriminating whether said magnetic pole position direction derived from said position calculating means is in an N-pole direction or in an S-pole direction; and said fault detecting means determines a fault when said polarity discriminating means does not discriminate the magnetic pole position direction within a predetermined time period.

13. A motor control apparatus for controlling a voltage applied to an alternating current (AC) motor using a PWM signal, comprising:

magnetic position estimating means for detecting a current of said AC motor to estimate a magnetic pole position of said AC motor; and fault detecting means for detecting a fault in an estimated magnetic pole position of said AC motor, wherein:

said fault detecting means shuts down an associated system when said fault detecting means detects a fault, said fault including oscillation and inversion of an estimated magnetic pole position.

14. A motor control apparatus according to claim 12, wherein:

said polarity discriminating means again corrects the polarity to continue a control when said fault detecting means detects a fault, said fault including oscillation and inversion of an estimated magnetic pole position.

15. An electric vehicle equipped with a motor-control apparatus for controlling a voltage applied to an alternating current (AC) motor using a PWM signal, said motor control apparatus comprising:

magnetic position estimating means for detecting a current of said AC motor to estimate a magnetic pole position of said AC motor; and fault detecting means for detecting a fault in an estimated magnetic pole position of said AC motor estimated by said magnetic position estimating means.

16. A motor control apparatus according to claim 1, wherein the magnetic position estimating means is operative to estimate the magnetic pole positions without direct detection of the magnetic pole position.

17. A motor control apparatus according to claim 1, wherein the magnetic position estimating means utilizes calculations in lieu of detection to estimate the magnetic pole position.

18. A motor control apparatus according to claim 1, wherein the voltage is controlled on the absence of a detector to sense magnetic pole position.

19. An electric vehicle according to claim 15, wherein the magnetic position estimating means is operative to estimate the magnetic pole positions without direct detection of the magnetic pole position.

20. An electric vehicle according to claim 15, wherein the magnetic position estimating means utilizes calculations in lieu of detection to estimate the magnetic pole position.

21. An electric vehicle according to claim 15, wherein the voltage is controlled on the absence of a detector to sense magnetic pole position.

22. A motor control apparatus for controlling a voltage applied to an alternating current (AC) motor using a PWM signal, consisting of:

magnetic position estimating means for detecting a current of said AC motor to estimate a magnetic pole position of said AC motor; and fault detecting means for detecting a fault in an estimated magnetic pole position of said AC motor estimated by said magnetic position estimating means.

23. An electric vehicle equipped with a motor control apparatus for controlling a voltage applied to an alternating current (AC) motor using a PWM signal, said motor control apparatus consisting of:

magnetic position estimating means for detecting a current of said AC motor to estimate a magnetic pole position of said AC motor; and fault detecting means for detecting a fault in an estimated magnetic pole position of said AC motor estimated by said magnetic position estimating means.

* * * * *